Feb. 15, 1927.  1,618,049
J. L. BLANCHARD
SPEEDOMETER AND ROAD INDICATOR
Filed May 21 1926   3 Sheets-Sheet 1
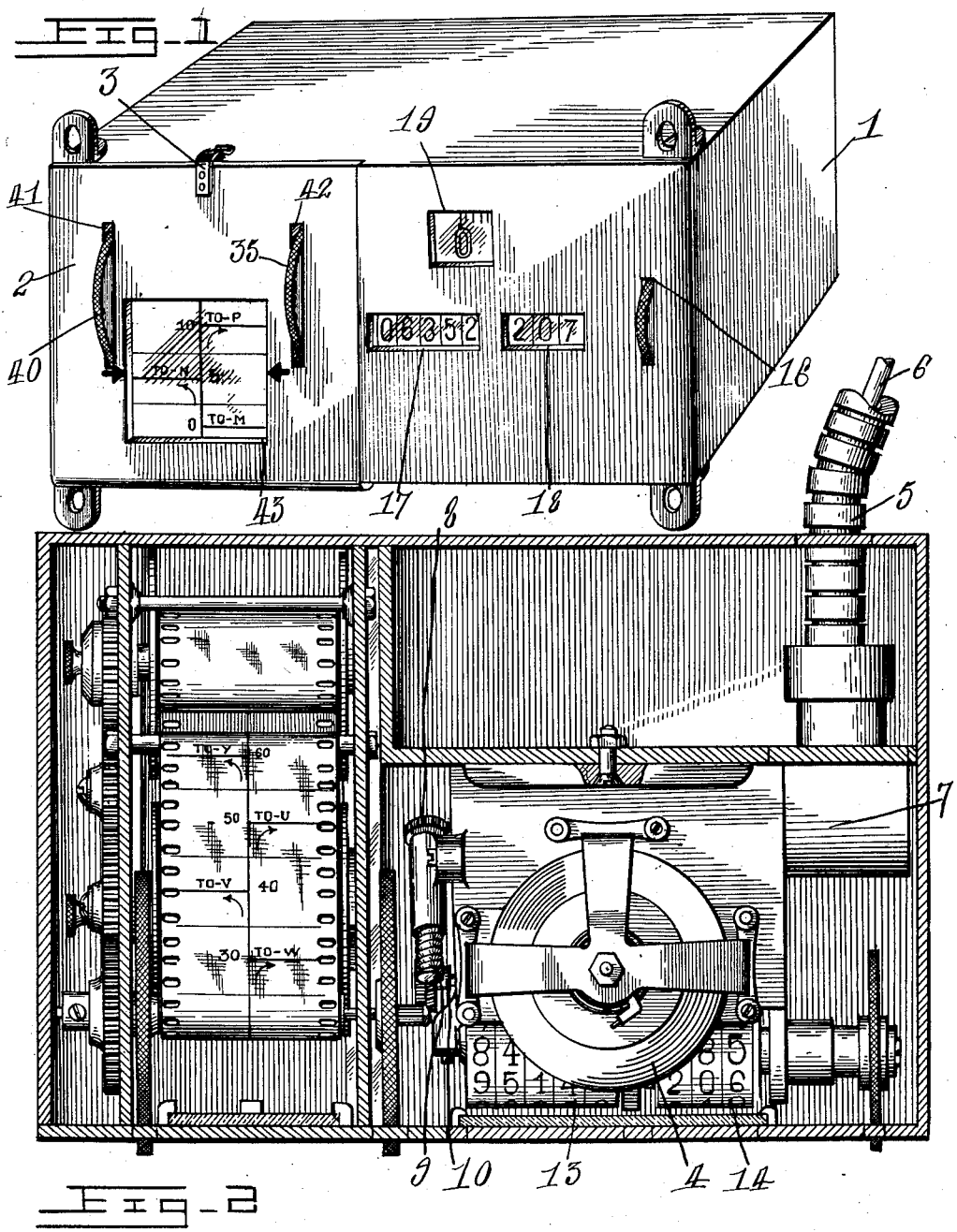
Inventor
J. Leopold Blanchard
By
Attorney Feb. 15, 1927. 1,618,049
J. L. BLANCHARD
SPEEDOMETER AND ROAD INDICATOR
Filed May 21, 1926 3 Sheets-Sheet 2
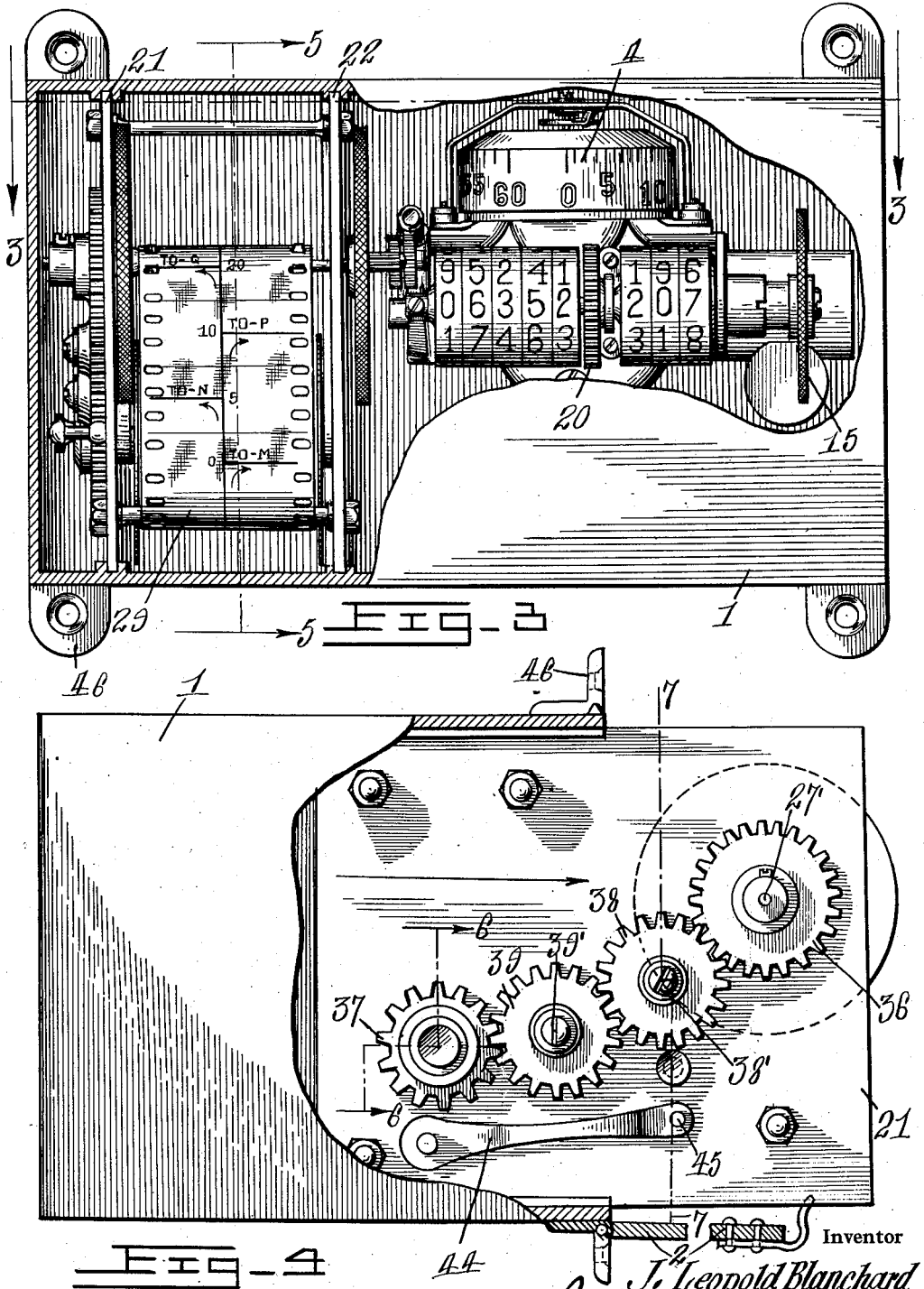

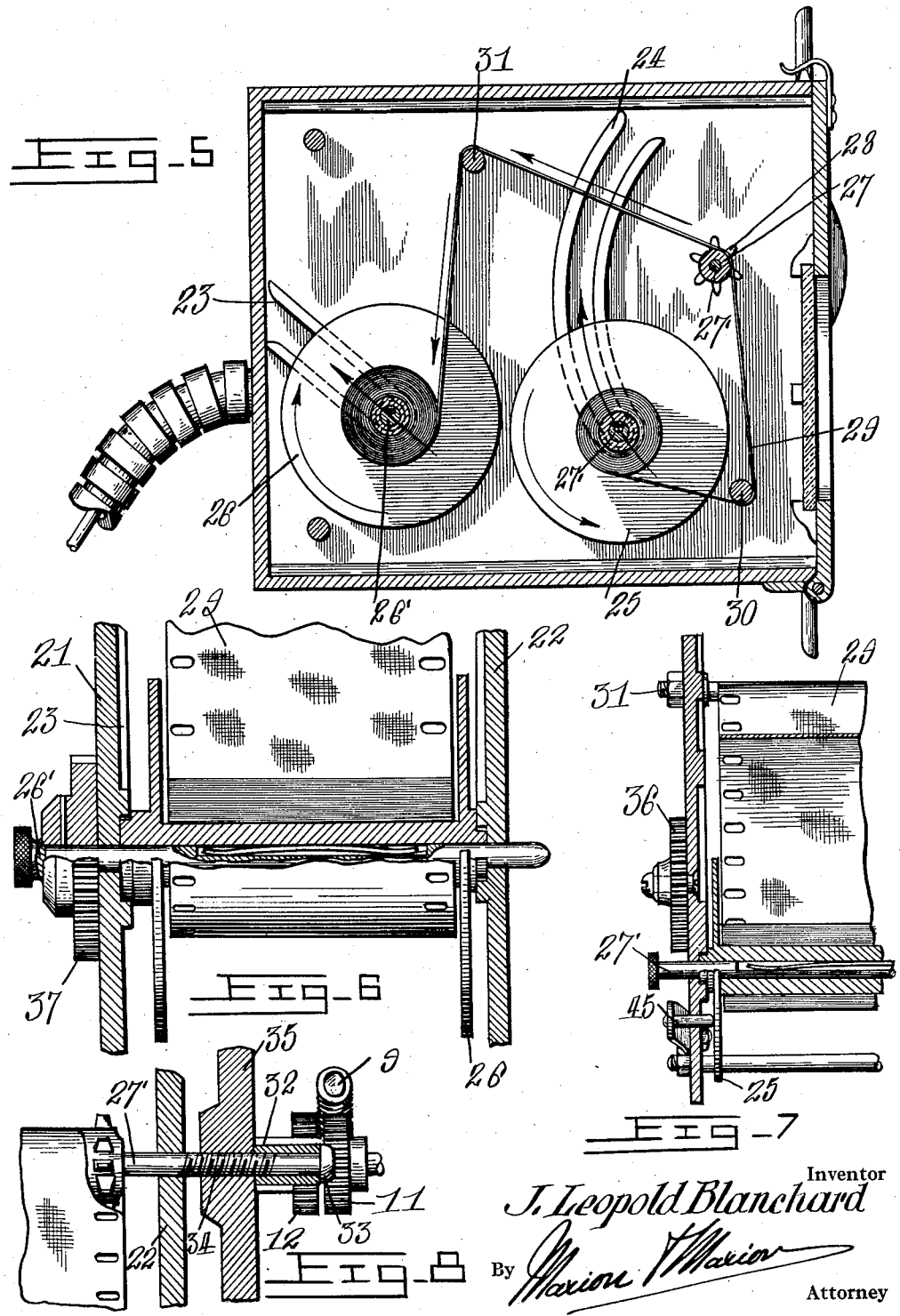

Patented Feb. 15, 1927.

1,618,049

UNITED STATES PATENT OFFICE.

JOSEPH LEOPOLD BLANCHARD, OF MONTREAL, QUEBEC, CANADA.

SPEEDOMETER AND ROAD INDICATOR.

Application filed May 21, 1926. Serial No. 110,766.

The present invention pertains to a novel speedometer and road indicator consisting essentially of a movable map strip which is actuated by mechanism geared to the speedometer.

The principal object of the invention is the provision of a device of this character wherein the movable map is driven from the speedometer in such a manner that the map will at all times indicate the exact position of the vehicle. Obviously, different maps will be used for different routes, and the device permits of the substitution and replacement of maps.

In addition to the usual speedometer, the device comprises a delivery spool and a take-up spool by means of which the map is shifted. The map is passed over a sprocket drum which aids in the shifting movement, and the shaft of this drum is geared to the speedometer shaft in such a manner that the movement of the map corresponds with the movement of the speedometer shaft. Also, the shaft of the sprocket roller and the shafts of the two spools are mutually connected by gearing so that the movement of each of these parts is positive and dependent on the movement of the remaining parts.

The invention is fully disclosed in the following description and in the accompanying drawings in which;

Figure 1 is a perspective view of the device;

Figure 2 is a plan section beneath the cover;

Figure 3 is a side elevation with the front wall partly broken away;

Figure 4 is an end view with the wall partly broken away and the map winding mechanism slightly drawn out of the housing;

Figure 5 is a section on the line 5—5 of Figure 3;

Figures 6 and 7 are detail sections of the drum winding mechanism; and

Figure 8 is a detail of the clutch between the counting mechanism and the map shifting mechanism.

Reference to these views will now be made by use of like characters which are employed to designate corresponding parts throughout.

As shown in Figure 1 the apparatus is enclosed within a housing 1 having a door 2 in the front wall thereof. The door is retained in closed position by means of a clip 3 secured to the upper edge thereof and cooperating with the top wall of the housing.

At one side of the housing is positioned a speedometer comprising in part a speed indicating disc 4 which is constructed and mounted in the manner already well known in the art. A flexible tube 5 extends into the casing through the rear wall thereof and serves to contain and protect a flexible shaft 6 which is rotated by a suitable mechanism at one of the wheels of the vehicle. The drum 4 is mounted upon a housing 7 which is entered at one end by the shaft 6. At the other end of the housing is journaled a pinion 8 and a worm 9 fixed in any suitable manner to the pinion in order to rotate therewith. The housing 7 contains a train of gearing between the inner end of the shaft 6 and the pinion 8. The housing further contains mechanism for actuating the speed indicating drum 4.

Beneath the worm 9 a stub shaft 10 is journalled in one end of the housing 7 as shown in Figure 2. This shaft carries a worm gear meshing with the worm 9 and also a pinion 12. The purpose of the latter is mentioned below.

Beneath the drum 4 is supported a counting device of usual construction consisting of two sets of counter discs 13 and 14. These operate simultaneously, the set 13 indicating total mileage and the set 14 indicating trip mileage. The latter set may be zeroized at the end of each trip by means of a knurled disc 15 mounted on the shaft of these discs and projecting through a slot 16 in the front wall of the housing (Figure 1). This wall is further formed with openings 17 and 18 for disclosing the readings on the discs 13 and 14 respectively, and further with another opening 19 for showing the reading on the indicator 4.

The shaft carrying the set 13 also carries a gear 20 (Figure 3) meshing with a pinion (not shown) mounted on the stub shaft 10. Motion is transmitted through the mechanism, as thus far described, from the shaft 6 to the gearing within the casing 7, from this gearing to the drum 4 and pinion 8, from the pinion to the worm 9 and gear 11, from the gear 11 to the stub shaft 10, gear 20, and counting device, and from the shaft 10 also to the pinion 12 carried thereby.

Adjacent the indicating device already described, the housing 1 further contains a road indicating mechanism disposed directly behind the door 2. This mechanism is supported between a pair of partitions 21 and 22 having slotted guides 23 and 24 for rotatably supporting a feed spool 25 and a take-up spool 26. Between the partitions is also journaled a sprocket drum 27 from which sprocket teeth 28 project near the ends thereof. A map strip 29 is passed from the feed spool 25 around a rod 30 (Figure 5) over the sprocket drum 28 around another rod 31, and finally to the take-up spool 26. The shaft 27' of the drum 27 projects in the direction of the members 11 and 12 (Figure 8) and carries a loose gear 32 meshing with the pinion 12. The free end of the shaft, which is disposed at one side of the partition 22, has a head 33 adjacent one end of the gear 32. At the other end of the gear, the shaft 27' is threaded as at 34 and is provided with a knurled clutch disc 35 fitted on the threads.

When the disc 35 is removed from the gear 32, the pinion 12 merely turns the gear idly on the shaft 27' and causes no motion of the map actuating mechanism. When it is desired that this mechanism be set in operation, the disc 35 is turned on the threads 34 in the direction of the gear 32 whereby the latter is clamped between the head 33 and the disc and in this manner locked on the shaft 27'. With the parts in this position, motion is transmitted from the pinion 12 through the gear 32 and shaft 37' to the sprocket spool 27.

The shaft 27' of the sprocket spool carries a gear 36 (Figure 4) at the end disposed at the outer side of the partition 21. In like manner the shaft 26' of the take-up spool 26 carries a gear 37 in alinement with the gear 36. A connective train between the gears 36 and 37 is completed by intermediate gears 38 and 39 loosely mounted on studs 38' and 39' in the partition 21. By this mechanism, the map strip 29 taken off the feed spool 25 is wound upon the take-up spool 26.

The sprocket drum shaft 27' carries a knurled disc 40 which enables the sprocket drum shaft to be turned independently of the speedometer movements, whereby the map strip may be adjusted or set in accordance with the position of the vehicle. The disc 40 projects through a slot 41 in the door 2, and the clutch disc 35 projects through a similar slot 42 in the door. Between the two slots, the door is formed with a comparatively large square opening 43 for showing the map.

To the outer side of the partition 21 is attached one end of a spring rod 44 as shown in Figure 4. The free end of the rod carries a pin 45 (Figure 7) passing through the partition and engaging a side of the spool 25 in order to hold the latter against slipping so that the strip 29 will be tight at all times. Also, the corners of the casing 1 are provided with ears 46 projecting outwardly and lying substantially in the place of the front wall of the housing. By means of these lugs the entire apparatus may be secured to the inner side of a dash board formed with an appropriate opening for exposing the entire front wall of the housing.

It will be apparent that when the map has been set to correspond with the location of the vehicle and the clutch 32—35 has been locked, the motion of the speedometer shaft 6 will be imparted to the map winding mechanism through the gearing already described. The gearing is dimensioned in such a manner that the map will move in synchronism with the speed of the vehicle so that the position of the latter will at all times be indicated. Various markings are made on the map strip such as the numerals to indicate distances, letters to indicate the destination of the transverse lines and curved arrows to indicate the turns.

The map strip may be printed on both sides so that it may be used for the return trip by merely inverting the spools.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:

1. A road indicating device comprising a pair of spools, a shaft, a sprocket drum on said shaft, a gear loose on said shaft and adapted to be geared to a speedometer, a clutch on said shaft for locking the gear thereto, and a map wound on said spools and passed over said sprocket drum.

2. A road indicating device comprising a pair of spools, a shaft, a sprocket drum on said shaft, a gear loose on said shaft and adapted to be geared to a speedometer, a map wound on said spools and passed over said sprocket drum, said shaft having a head engaging one side of said gear, and a disc threaded on said shaft and adapted to clamp against the other side of said gear.

3. In a housing, a speedometer mounted therein, a pair of partitions adjacent the speedometer, a pair of spools journaled between the partitions, a shaft journaled between the partitions, a sprocket drum on said shaft, a gear loose on said shaft and geared to the speedometer, a map wound on said spools and passed over said drum, and a clutch on said shaft for locking said loose gear thereto.

In witness whereof I have hereunto set my hand.

JOSEPH LEOPOLD BLANCHARD.